(12) United States Patent
Pollack et al.

(10) Patent No.: US 11,498,217 B2
(45) Date of Patent: Nov. 15, 2022

(54) METHODS AND APPARATUS TO CALIBRATE A POSITIONAL ORIENTATION BETWEEN A ROBOT GRIPPER AND A COMPONENT

(71) Applicant: Siemens Healthcare Diagnostics Inc., Tarrytown, NY (US)

(72) Inventors: Benjamin S. Pollack, Jersey City, NJ (US); Steven Pollack, Washington Crossing, PA (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 981 days.

(21) Appl. No.: 16/316,938

(22) PCT Filed: Jun. 27, 2017

(86) PCT No.: PCT/US2017/039580
§ 371 (c)(1),
(2) Date: Jan. 10, 2019

(87) PCT Pub. No.: WO2018/013344
PCT Pub. Date: Jan. 18, 2018

(65) Prior Publication Data
US 2019/0299415 A1    Oct. 3, 2019

Related U.S. Application Data

(60) Provisional application No. 62/362,529, filed on Jul. 14, 2016.

(51) Int. Cl.
*B25J 9/16*      (2006.01)
*B25J 13/08*    (2006.01)
(Continued)

(52) U.S. Cl.
CPC ........... *B25J 9/1692* (2013.01); *B25J 9/1676* (2013.01); *B25J 13/081* (2013.01); *G01B 5/012* (2013.01);
(Continued)

(58) Field of Classification Search
CPC ...... B25J 9/1692; B25J 13/082; B25J 13/081; B25J 9/1669; B25J 9/1676; B25J 11/005;
(Continued)

(56) References Cited

U.S. PATENT DOCUMENTS 5,929,584 A    7/1999    Gunnarsson et al.
6,205,839 B1   3/2001    Brogardh et al.
(Continued)

FOREIGN PATENT DOCUMENTS

JP    S63-162180 A    7/1988
JP    2001-246267 A   9/2001
(Continued)

OTHER PUBLICATIONS

PCT International Search Report and Written Opinion dated Sep. 6, 2017 (8 Pages).
(Continued)

*Primary Examiner* — Khoi H Tran
*Assistant Examiner* — Tanner L Cullen (57) ABSTRACT

Methods of calibrating a position of a component include providing a robot with a gripper and crush and crash sensors, a calibration tool coupled to the gripper, and the component, which has a recess and a crush zone. The methods also include moving the gripper in a first direction to sense contact between the calibration tool and the crush zone, recording the contact position, and moving the gripper to insert the tool into the recess. The gripper is then moved in second directions to sense contact between the tool and the recess and moved in third directions to also sense contact (Continued)

between the tool and the recess. The methods further include recording and processing the contact positions to determine a surface location in the first direction and a physical center of the recess. Robot calibration apparatus for performing the method is also disclosed, as are other aspects.

24 Claims, 8 Drawing Sheets

(51) Int. Cl.
    *G05B 19/401* (2006.01)
    *G01B 5/012* (2006.01)
    *G01N 35/00* (2006.01)
    *G01N 35/10* (2006.01)
    *G01N 35/04* (2006.01)

(52) U.S. Cl.
    CPC ... *G01N 35/0099* (2013.01); *G01N 35/00693* (2013.01); *G01N 35/1011* (2013.01); *G05B 19/401* (2013.01); *G01N 2035/041* (2013.01); *G01N 2035/0493* (2013.01); *G01N 2035/0494* (2013.01)

(58) Field of Classification Search
    CPC ........ G05B 19/401; G05B 2219/39021; G05B 2219/37008; G05B 2219/37069; G05B 19/18; G01B 5/012; G01N 35/0099; G01N 35/00693; G01N 35/1011; G01N 2035/041; G01N 2035/0493; G01N 2035/0494
    See application file for complete search history.

(56) References Cited

U.S. PATENT DOCUMENTS

| | | | | |
|---|---|---|---|---|
| 2005/0043849 | A1* | 2/2005 | Coleman | G01B 21/042 700/195 |
| 2010/0200552 | A1* | 8/2010 | Mienhardt | B23K 26/38 219/121.72 |
| 2013/0096718 | A1 | 4/2013 | Friedman et al. | |
| 2013/0345894 | A1* | 12/2013 | Haddad | B01L 3/56 700/302 |
| 2014/0005829 | A1 | 1/2014 | Chhatpar et al. | |
| 2014/0100694 | A1* | 4/2014 | Rueckl | B25J 9/1692 700/254 |
| 2014/0173870 | A1 | 6/2014 | Otts | |
| 2015/0025674 | A1 | 1/2015 | Pfeiffer | |
| 2015/0142171 | A1 | 5/2015 | Li et al. | |
| 2016/0054722 | A1* | 2/2016 | Jalluri | G05B 19/404 700/195 |
| 2016/0339590 | A1* | 11/2016 | Lin | B25J 15/0408 |
| 2016/0349278 | A1* | 12/2016 | Johns | G01B 11/10 |
| 2017/0045357 | A1* | 2/2017 | Lummes | G05B 19/401 |
| 2017/0363404 | A1* | 12/2017 | Sato | G01B 5/243 |
| 2018/0256271 | A1* | 9/2018 | Tojo | B25J 3/04 |
| 2018/0281175 | A1* | 10/2018 | Davis | G05B 19/4015 |
| 2019/0111534 | A1* | 4/2019 | Ishii | G01B 21/047 |

FOREIGN PATENT DOCUMENTS

| | | |
|---|---|---|
| JP | 2007-185746 A | 7/2007 |
| JP | 2013-529556 A | 7/2013 |
| JP | 2015-530276 A | 10/2015 |
| JP | 2016-501733 A | 1/2016 |
| WO | 2008145184 A1 | 12/2008 |
| WO | 2011/163184 A1 | 12/2011 |
| WO | 2015162431 A1 | 10/2015 |

OTHER PUBLICATIONS

Extended EP Search Report dated Jun. 7, 2019 of corresponding European Application No. 17828168.9, 4 Pages.

* cited by examiner

METHODS AND APPARATUS TO CALIBRATE A POSITIONAL ORIENTATION BETWEEN A ROBOT GRIPPER AND A COMPONENT

CROSS-REFERENCE TO RELATED APPLICATIONS

This application claims priority to U.S. provisional application Ser. No. 62/362,529 filed on Jul. 14, 2016, the contents of which is incorporated herein by reference in its entirety.

FIELD

Embodiments of the disclosure relate to methods and apparatus adapted to calibrate a positional orientation of a robot component, such as a robot gripper, to another component such as a sample rack in systems for transporting biological liquid containers.

BACKGROUND

In medical testing and processing, the use of robotics may minimize exposure to, or contact with, biological liquid samples (otherwise referred to as "specimens") and/or may increase productivity. For example, in some automated testing and processing systems (e.g., clinical analyzers), biological liquid containers (such as test tubes, vials, and the like) may be transported to and from sample racks (sometimes referred to as "cassettes") and to and from a testing or processing location of a testing or processing apparatus.

Such transportation may be accomplished by the use of an automated mechanism such as a robot having a coupled gripper that may have opposed gripper fingers configured to grasp the biological liquid containers. The gripper may be moved in two or more coordinate directions by the robot. In this way, the biological liquid containers (containing specimens to be tested or processed) may be gripped by the gripper, and then moved from one location to another location in relationship to the testing or processing location. For example, the biological liquid containers may be moved to and from receptacles of a sample rack.

Inaccurate calibration of the robot may result in inaccurate positioning of the gripper fingers, which may possibly cause collisions or jams between the gripper and the biological liquid containers, and/or between the biological liquid containers being moved and the testing or processing system and/or sample rack. Additionally, inaccurate calibration may possibly contribute to jarring pick and place operations of the biological liquid containers by the gripper, which may contribute to unwanted specimen spillage.

Accordingly, methods and apparatus that may improve accuracy of positioning of a gripper relative to an article, such as a sample rack, in testing and processing systems are desired.

SUMMARY

In a method embodiment, a method of calibrating a position of a gripper to a sample rack is provided. The method includes providing a robot including the gripper, the gripper moveable in a coordinate system and including a crush sensor and a crash sensor, the crush sensor configured to sense a vertical crush event and the crash sensor configured to sense a horizontal crash event, providing a calibration tool coupled to the gripper, providing a sample rack including a recess and a crush zone, lowering the gripper in the coordinate system and sensing vertical contact between the calibration tool and the crush zone of the sample rack, as sensed by the crush sensor, recording the vertical position in the coordinate system of the vertical contact, as sensed by the crush sensor, moving the gripper in the coordinate system to position the calibration tool within the recess, moving the gripper in first horizontal directions in the coordinate system and sensing contact between the calibration tool and two first horizontal positions of the recess, as sensed by the crash sensor, moving the gripper in second horizontal directions in the coordinate system and sensing contact between the calibration tool and two second horizontal positions of the recess, as sensed by the crash sensor, recording the two first horizontal positions and the two second horizontal positions; and processing the two first horizontal positions and the two second horizontal positions to determine a location of a center of the recess.

In an apparatus embodiment, a robot calibration system is provided. The robot calibration apparatus includes a robot including a gripper, a crush sensor configured to sense a vertical crush event, and a crash sensor configured to sense a horizontal crash event, the robot configured to cause motion of the gripper in a coordinate system, a calibration tool coupled to the gripper, a sample rack including a recess and a crush zone positioned in the coordinate system, a controller operably coupled to the robot, the controller configured and operable to: cause vertical movement of the calibration tool to contact the crush zone and record vertical contact coordinates in the coordinate system, cause horizontal motion of the calibration tool to contact sides of the recess and record horizontal contact coordinates in the coordinate system, and process the vertical contact coordinates received from the crush sensor and horizontal contact coordinates received from the crash sensor to determine a location of a vertical feature of the sample rack and a center of the recess in the coordinate system.

In another apparatus embodiment, a robot calibration apparatus is provided. The robot calibration apparatus includes a robot including moveable arms and a gripper coupled to one of the moveable arms, a crush sensor configured to sense a crush event, and a crash sensor configured to sense a crash event, the robot configured to cause motion of the gripper in a coordinate system, a calibration tool coupled to the gripper, a component including a recess and a flat surface, the component positioned in the coordinate system, and a controller operably coupled to the robot, the controller configured and operable to: cause movement of the calibration tool in a first direction to contact the flat surface and record a first contact coordinate in the first direction in the coordinate system based on signals from the crush sensor, cause motion of the calibration tool in second directions and third directions to contact opposing sides of the recess and record second and third contact coordinates in the second and third directions in the coordinate system based on signals from the crash sensor, and process the first, second, and third contact coordinates received from the crush sensor and the crash sensor to determine a location of a feature of the component in the first direction, and a center of the recess.

Still other aspects, features, and advantages of the present disclosure may be readily apparent from the following detailed description by illustrating a number of example embodiments, including the best mode contemplated for carrying out the present invention. The present invention may also be capable of different embodiments, and its several details may be modified in various respects, all without departing from the scope of the present disclosure. Accordingly, the disclosure is to cover all modifications, equivalents, and alternatives falling within the scope of the invention as defined in the appended claims.

DETAILED DESCRIPTION

In robots, such as those used to accomplish robotic pick and place operations in clinical analyzers or other testing or processing systems, for the aforementioned reasons, achieving precision in the placement of the gripper is a desired goal. "Gripper" as used herein is any member coupled to a robot (e.g., to a robot arm) that is used in robotic operations to grasp and/or move an article (e.g., a specimen container) from one location to another, such as in a pick and place operation. In such robots, relatively high positional precision of the gripper carrying and/or retrieving a specimen container, for example, relative to component including a pick or placement location (e.g., a receptacle of a sample rack) may be desired to prevent the afore-mentioned crashes, jams, and spillage. However, easily calibrating the exact location of such pick or placement location relative to a gripper moveable in a coordinate system has been elusive, and in some cases has required sophisticated optical systems to do so.

In view of the foregoing, embodiments of the present disclosure provide calibration methods and robot calibration apparatus that are readily able to determine an actual position of a gripper of a robot relative to a component accessible by the gripper, such that the gripper may be configured to precisely pick and/or place an article (e.g., a specimen container) from or to one or more defined locations.

These and other aspects and features of one or more embodiments of the disclosure will be described with reference to FIGS. 1-5 herein.

Figure 1:
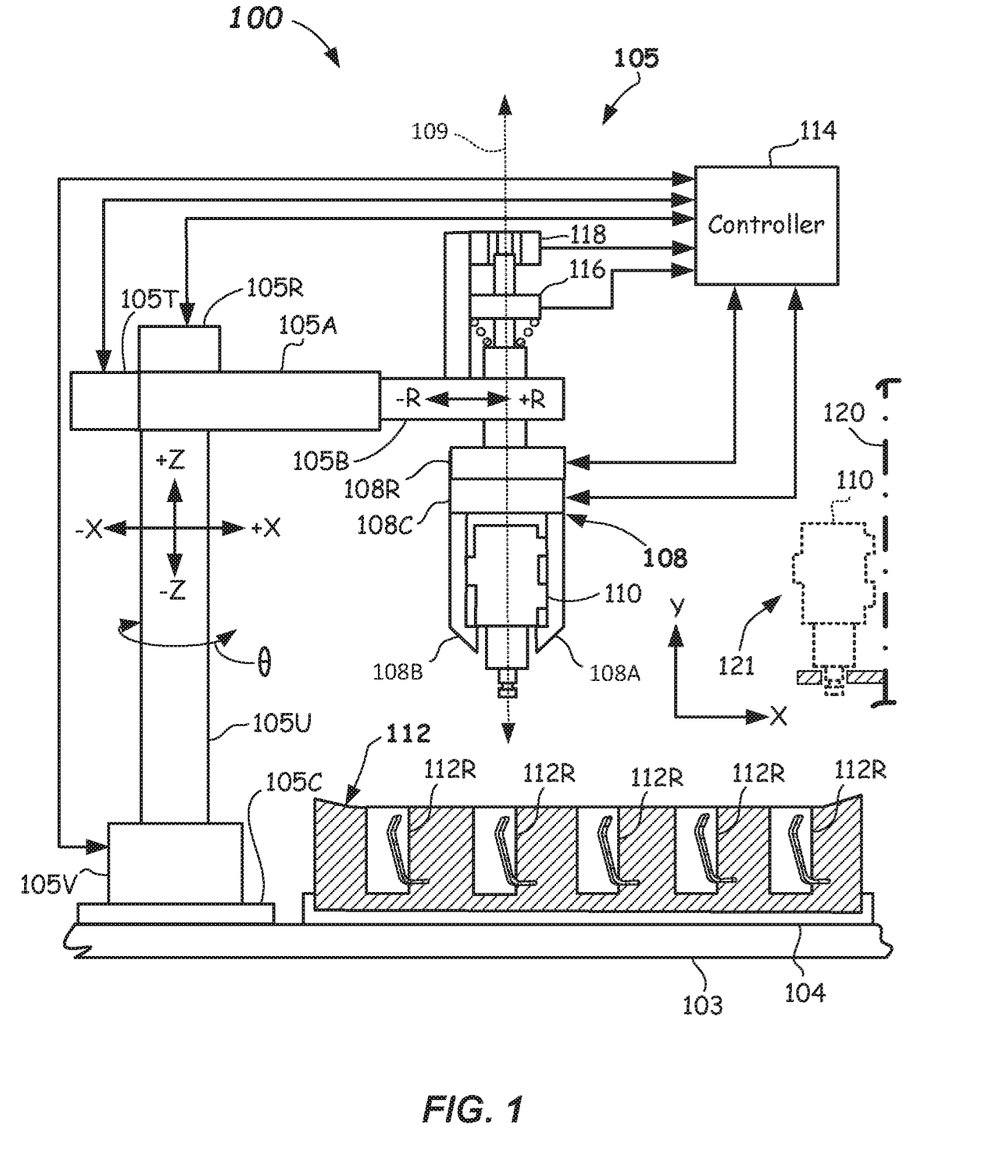
FIG. 1 illustrates a schematic side view of a robot calibration apparatus according to one or more embodiments.

In accordance with a first apparatus embodiment, as best shown in FIG. 1, a robot calibration apparatus 100 and calibration method using the robot calibration apparatus 100 are described. The robot calibration apparatus 100 includes a robot 105 that is useful for grasping a sample container (not shown in FIG. 1), such as blood collection vessel, sample tube, or the like, at a first location (e.g., a staging location) and transferring the sample container to a second location (e.g., a processing location). The robot 105 may be used in a diagnostic machine such as an automated testing instrument, such as a clinical analyzer, centrifuge, or other processing or testing system (e.g., a biological fluid specimen processing or testing system).

The robot 105 includes a gripper 108 coupled to a moveable part of the robot 105 (e.g., to a second robot arm 105B thereof). Gripper 108 may be coupled by mechanical mechanism, which in some embodiments may allow some limited motion vertically and/or horizontally, as shown. The limited motion may be provided to accommodate sensing, as will be explained below by allowing a triggering signal to be generated after some amount of limited deflection. The gripper 108 may include two or more gripper fingers 108A, 108B. The gripper fingers 108A, 108B may be opposed and relatively moveable to one another and adapted to grasp articles, such as specimen containers (e.g., blood collection vessels).

The gripper fingers 108A, 108B may be driven to open and close along any suitable direction in an X-Y plane perpendicular to the Z axis (e.g., in the X or Y direction or combinations thereof) by an actuation mechanism 108C. The actuation mechanism 108C may be an electric, pneumatic, or hydraulic servo motor, or the like coupled to the gripper fingers 108A, 108B which may be moveable linearly or pivotally to provide gripping capability. Other suitable mechanisms for causing gripping action of the gripper fingers 108A, 108B may be used. Furthermore, although two fingers are shown, the present invention is equally applicable to a gripper 108 having more than two gripper fingers 108A, 108B. Other gripper types may be used, as well. The robot 105 may be any suitable robot capable of moving the gripper 108 within the X, Y, and Z coordinate system (e.g., in three-dimensional space).

The robot 105 may, for example, be an R, theta, Z robot, as is shown. The robot 105 may have a rotational motor 105R configured to rotate a first robot arm 105A to a desired angular orientation in a rotational direction θ. The robot 105 may include a translational motor 105T that may be configured to move the second robot arm 105B and coupled gripper 108 in a +/−R direction (in the X, Y plane), as shown. The robot 105 may include a vertical motor 105V that may be configured to move an upright 105U in a vertical direction (e.g., along a +/−Z direction as indicated by the axis shown). However, other suitable robot motors and mechanisms for imparting X, θ, and/or Z motion or other combinations of motion (e.g., X, Y, and Z) may be provided. Suitable feedback mechanisms may be provided for each degree of motion such as from position and/or rotation encoders. Thus, the gripper coordinate system may be R, Theta, and Z or X, Y, Z, or any subset or combination thereof.

In one or more embodiments, the robot 105 may be used to accomplish motion of the gripper 108 so that specimen containers (not shown) may be placed in, or removed from, a recess, such as a receptacle 112R of a sample rack 112, or placed in, or removed from, other positions accessible by the robot 105.

Additionally, in one or more embodiments, the robot 105 may accomplish a rotation of the gripper 108 about gripper rotational axis 109, so that the gripper fingers 108A, 108B may be precisely rotationally oriented relative to a specimen container (not shown). The robot 105 may include a gripper rotational motor 108R adapted to impart rotational motion about the gripper rotational axis 109 to the gripper fingers 108A, 108B. A rotational encoder may be included to feedback information concerning the rotational orientation of the gripper fingers 108A, 108B to the controller 114. The motors may be stepper motors, one or more servo motors, one or more pneumatic or hydraulic motors, one or more electric motors, or combinations thereof.

The controller 114 may include a microprocessor, processing circuits (including A/D converters, amplifiers, filters, etc.), memory, and driving and feedback circuits configured and operable to control the operation of the various robot components (e.g., rotational motor 105R, translational motor 105T, and vertical motor 105V, actuation mechanism 108C, and gripper rotational motor 108R and process inputs from encoders and sensors. Other types of robots other than robot 105 shown may be employed to impart motion of the gripper 108 in the coordinate system, such as gantry robot, a multi-arm articulated robot, or the like.

The robot 105 may include a crush sensor 116 and crash sensor 118 coupled to the controller 114 so that vertical and/or horizontal contact may be sensed. The crush sensor 116 may be configured to sense a vertical crush event, and the crash sensor 118 may be configured to sense a horizontal crash event. The crush sensor 116, in some embodiments, may allow limited motion of the gripper 108 in the Z direction, and thus may enable the robot 105 to sense when the gripper 108 has made contact with an article in the Z direction, wherein the triggering is after a certain displacement is achieved. In other embodiments, a signal is sent from the crush sensor 116 and/or crash sensor 118 and contact is determined when a certain magnitude of the respective signal exceeds predetermined crush or crash thresholds. Exceeding the threshold is indicative of a contact being made.

In some embodiments, triggering indicates hard contact between a specimen container grasped by the gripper 108 and an article, or between the gripper 108 and the article. For example, the crush sensor 116 may sense when a specimen container gripped by gripper 108 is inserted fully into the bottom of a receptacle 112R. The crash sensor 118 may be configured to sense a horizontal crash between an article and an item grasped by the gripper 108, or between the gripper 108 and the article.

Crash sensor 118 may be operable to trigger and provide a crash signal to controller 114 when a certain predetermined displacement is exceeded. In other embodiments, a signal may be provided to the controller 114 and contact is determined when the signal is above a threshold value, thus indicating contact between an item grasped by the gripper 108 and an article, or between the gripper 108 and the article. For example, the crash sensor 118 may provide a crash signal when lateral contact between a specimen container carried by the gripper 108 and a second specimen container is made, or when the expected location of the receptacle 112R of the sample rack 112 does not substantially coincide with the actual location, such that the specimen container is deflected horizontally.

Prior to attempting transport of specimen containers with the robot 105 and gripper 108, the robot calibration apparatus 100 may be used to perform a calibration method according to another embodiment. During the calibration method, the robot calibration apparatus 100 includes a calibration tool 110. Calibration tool 110 may be coupled to the gripper in a known orientation, such as by grasping the gripper 108 with the gripper fingers 108A, 108B. The calibration tool 110 may be used to facilitate calibration. In particular, the calibration tool 110 may be housed on, or within, an automated testing and/or processing system. For example, the calibration tool 110 may be mounted to a wall or frame 120 at a storage location 121 in or on the automated testing and/or processing system including the robot 105. The storage location 121 and calibration tool 110 may be located at a position that is accessible by the robot 105. Otherwise, the calibration tool 110 may be manually coupled to the gripper 108 by an operator.

Figure 2A:
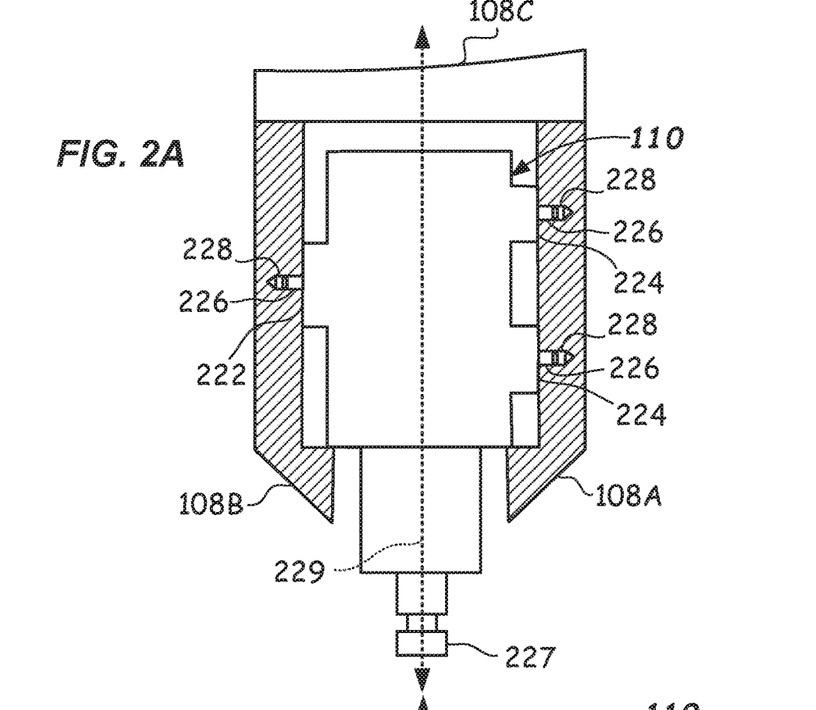
FIG. 2A illustrates a first side plan view of a calibration tool according to one or more embodiments.
Figure 2B:
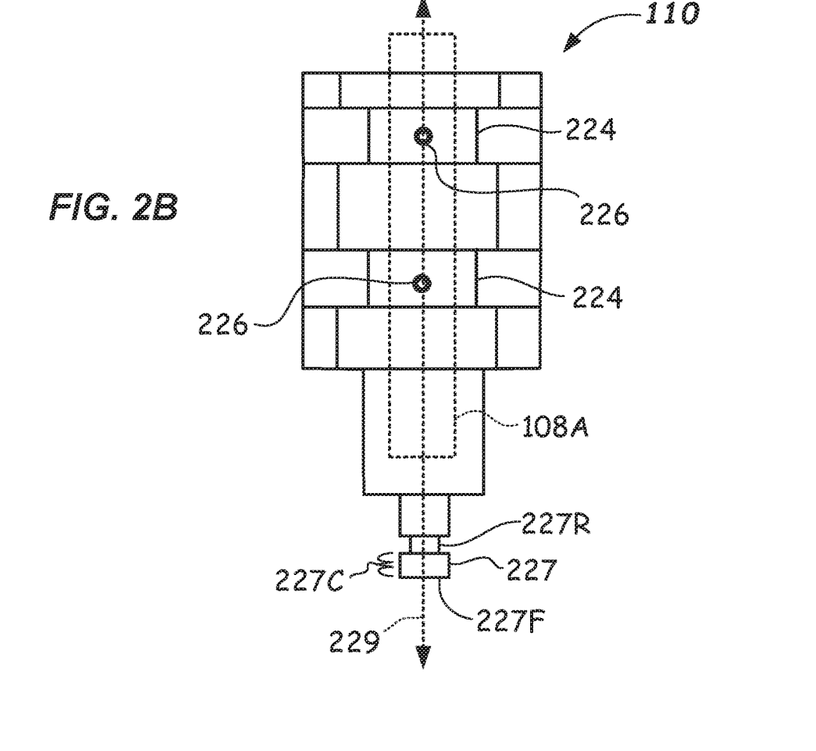
FIG. 2B illustrates a second side plan view of a calibration tool, rotated ninety degrees from the first side plan view of FIG. 2A, according to one or more embodiments.

The calibration tool 110, as best shown in FIGS. 2A and 2B, may include a body configured to be coupled to the gripper 108. For example, in the depicted embodiment, the calibration tool 110 may be gripped by the gripper fingers 108A, 108B. In particular, the gripper fingers 108A, 108B may be configured to grasp first boss 222 and second bosses 224. The first boss 222 and second bosses 224 may include one or more tool positioning features 226. The one or more tool positioning features 226 operatively engage with one or more gripper positioning features 228 formed on one or more of the gripper fingers 108A, 108B. In some embodiments, the tool positioning features 226 comprise one or more pins. The one or more gripper positioning features 228 may comprise holes into which the one or more pins are received.

The calibration tool 110 may include a stylus 227 on a lower end thereof. Stylus 227 may include a cylindrical end 227C of a known cylindrical dimension (e.g., diameter) and a flat lower surface 227F oriented perpendicular to the central axis 229 of the calibration tool 110. A recess 227R may be provided above the cylindrical end 227C. A vertical distance to the flat lower surface 227F of the stylus 227 from one or more tool positioning features 226 formed on one or more of the gripper fingers 108A, 108B is a known distance.

Figure 6:
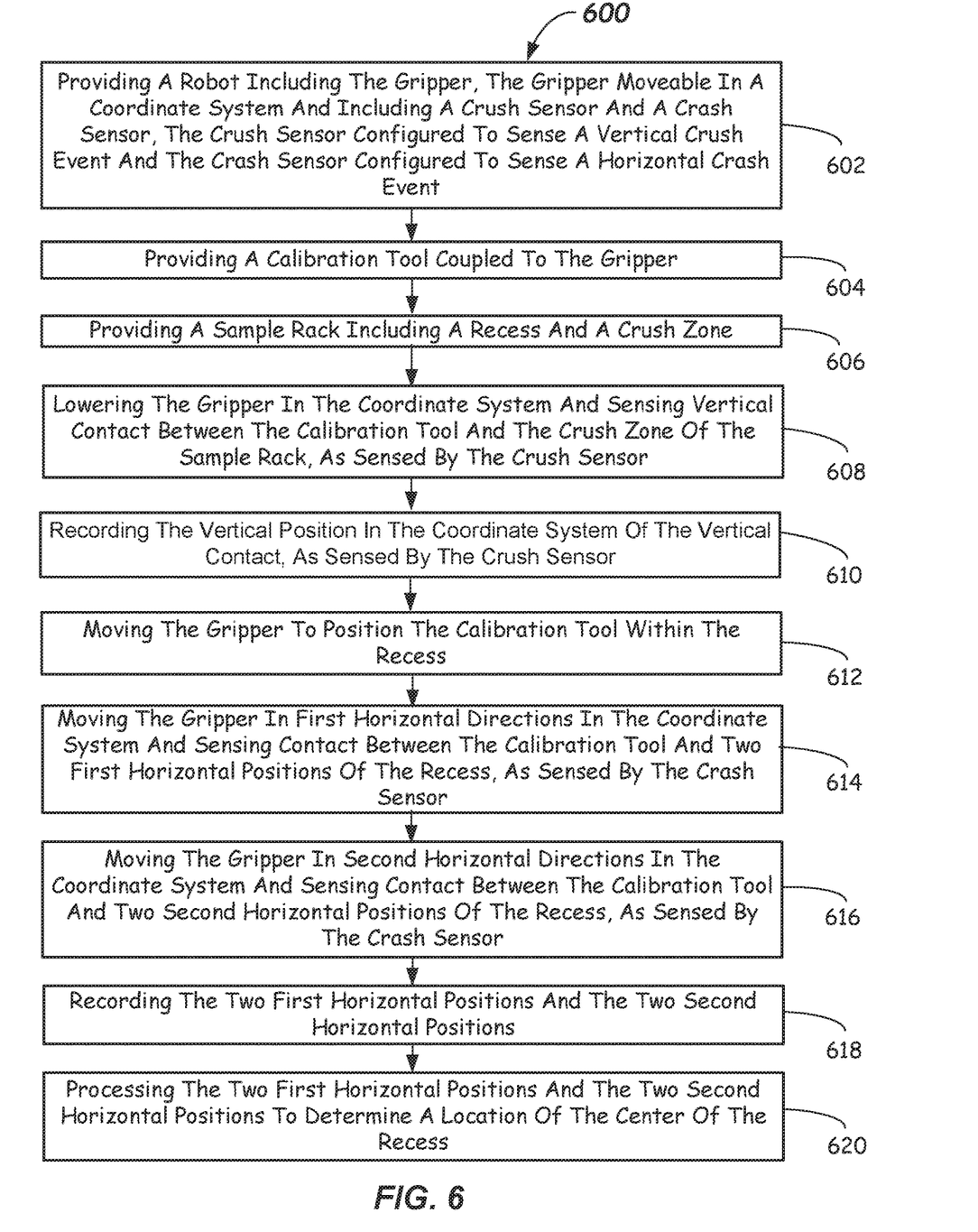
FIG. 6 illustrates a flowchart illustrating a method of calibrating a position of a gripper to a component (e.g., a sample rack) according to embodiments.

One method of calibrating a position of a gripper 108 to a sample rack 112 will now be described. The method 600, as best shown in FIG. 6 includes, in 602, providing a robot (e.g., robot 105) including the gripper (e.g., gripper 108), the gripper moveable in a coordinate system and including a crush sensor (e.g., crush sensor 116), and a crash sensor (e.g., crash sensor 118), wherein the crush sensor is configured to sense a vertical crush event and the crash sensor is configured to sense a horizontal crash event.

The method 600 further includes, in 604, providing a calibration tool (e.g., calibration tool 110) coupled to the gripper (e.g., gripper 108) as described above, and, in 606, providing a sample rack (e.g., sample rack 112) including a recess (e.g., receptacle 112R or calibration hole 332) and a crush zone (e.g., crush zone 334).

Figure 3A:
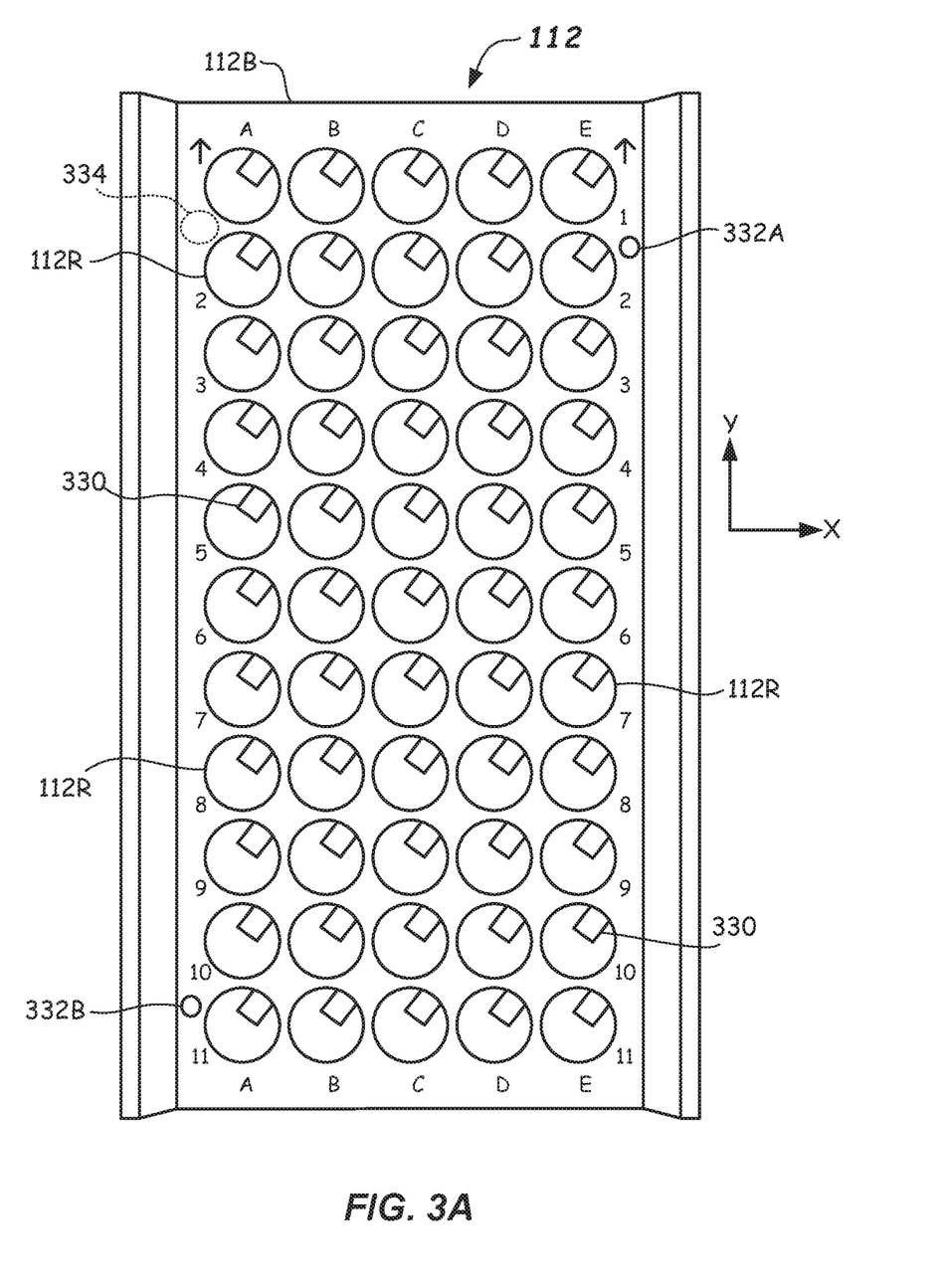
FIG. 3A illustrates a top plan view of a component comprising a sample rack according to one or more embodiments.

The sample rack 112, as best shown in FIG. 3A, may include a rack body 112B formed of a molded plastic, for example. The rack body 112B may include multiple recesses formed therein. Recesses may include a plurality of receptacles 112R configured to receive specimen containers (not shown). The receptacles 112R may be arranged in rows (e.g., rows 1-11 shown) and columns (columns A-E shown).

However, sample racks 112 having a different number of rows or columns may be used.

Each receptacle 112R may in one or more embodiment include one or more springs 330 that are configured to either center or push the specimen container to one side of the receptacle 112R upon being inserted therein. In addition to receptacles 112R, one or more additional recesses may be provided in the sample rack 112, such as a first calibration hole 332A and second calibration hole 332B. Further, a crush zone 334 may be provided on the sample rack 112. The crush zone 334 may be a zone having a flat surface, which may be precision machined or precision molded to have flatness of +/−0.5 mm over the crush zone 334, for example. The crush zone 334 may be an area of about 250 mm$^2$ or more, for example. The crush zone 334 having a round shape that is shown. However, any shape may be used, such as square, triangular, rectangular, or the like. Accounting for tolerance buildup of the robot 105, the crush zone 334 may be made large enough so that it can be contacted with the calibration tool 110. The crush zone 334 may be provided elsewhere on the sample rack 112, or multiple crush zones may be provided at more than one location. The crush zone 334 may be recessed below the upper surface in some embodiments. The crush zone 334 is provided in a known positional relationship to a feature of the sample rack 112, such as a top surface thereof or bottom of a receptacle 112R thereof.

In accordance with the method 600, in 608, the gripper 108 is lowered in the coordinate system and vertical contact between the calibration tool 110 and the crush zone 334 of the sample rack 112 is sensed by the crush sensor 116. In 610, the vertical position in the coordinate system of the vertical contact is recorded, as sensed by the crush sensor 116. The vertical contact position may be determined based on a reading of a vertical encoder of the robot 105, and recorded the vertical contact position in memory. A vertical offset distance from the end of the gripper 108 to the flat lower surface 227F of the stylus 227 of the calibration tool 110 is added to the vertical contact position measured from robot zero in the Z direction to provide a calibrated vertical distance to the crush zone 334. The crush zone 334 is provided at a known distance from the bottoms of the receptacles 112R, the top of the sample rack 112, or both. Thus, the calibration using the crush sensor 116 may be used to determine the calibrated distance to the top of the sample rack 112, and/or the bottoms of the receptacles 112R.

Figure 3B:
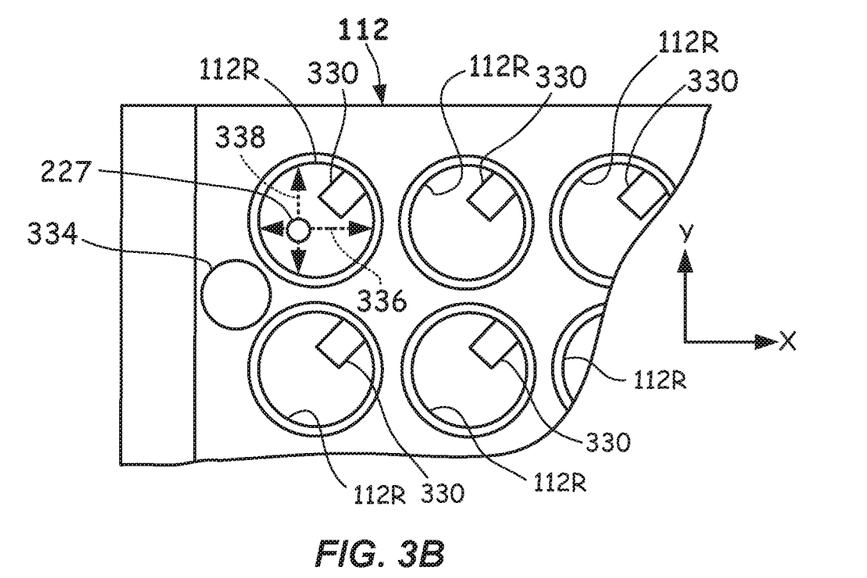
FIG. 3B illustrates a partial top view of a sample rack illustrating a crush zone and arrows indicating horizontal directional moves of the stylus of the calibration tool in first and second directions according to one or more embodiments.

Further, the method 600 includes, in 612, moving the gripper 108 in the coordinate system as shown in FIG. 3B to position the calibration tool 110 (e.g., the stylus 227) within the recess (e.g., within the receptacle 112R, calibration hole 332A, or calibration hole 332B). Once in the recess, the gripper 108 is moved in first horizontal directions 336 in the coordinate system and contact between the calibration tool 110 and two first horizontal positions of the recess is sensed by the crash sensor in 614. Contacting the two first horizontal positions involves contacting a first side of the recess followed by contacting a second opposite side of the recess.

According to the method 600, in 616, the gripper may be moved in second horizontal directions 338 in the coordinate system and sensing contact between the calibration tool 110 (e.g., with the stylus 227) and two second horizontal positions of the recess (e.g., receptacle 112R, as shown), as sensed by the crash sensor 118.

According to the method 600, in 618, the two first horizontal positions and the two second horizontal positions are recorded (e.g., in memory), and then in 620, the two first horizontal positions and the two second horizontal positions are processed by the controller 114 to determine location of a center of the recess in the coordinate system. Averaging of the measured two first horizontal positions can provide a location in X, while simple averaging the two second horizontal positions can provide a location in Y.

As shown in FIG. 3B, after finding the center location of a first receptacle 112R in the coordinate system as described with reference to FIG. 3A, the method 600 may proceed to determine a center location of a second recess comprising a second receptacle 112R'. This may be accomplished by repeating the above-described method 600 on the second receptacle 112R' by determining two third horizontal positions along third directions 340 and the two fourth horizontal positions along fourth directions 342.

Once the center location of the first recess (e.g., receptacle 112R) and the second recess (second receptacle 112R') is known, a location of other features (e.g., location of one or more other receptacles 112R) of the sample rack 112 may be determined based on the known geometry of the sample rack 112 to the receptacles 112R, 112R' whose center location was found. Any two recesses may be used. However, in one embodiment, recesses located at the diagonal corners the farthest away from one another may be used.

Figure 3C:
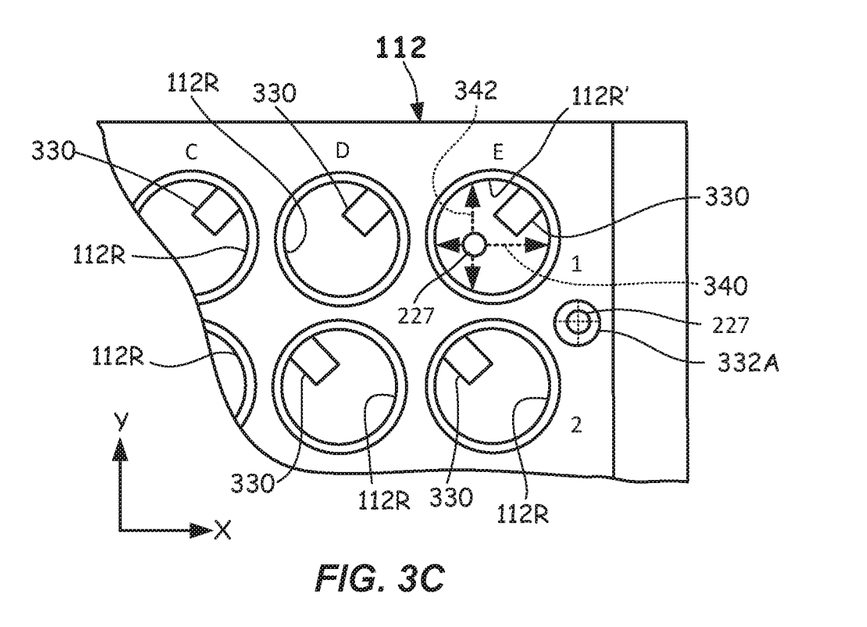
FIG. 3C illustrates another partial top view of a sample rack illustrating additional directional moves of the stylus of the calibration tool and a recess comprising a locating hole for the calibration tool according to one or more embodiments.

In some embodiments, such as shown in FIG. 3C, the recess may be a calibration hole 332A and the center finding method is carried out in the manner discussed above within the calibration hole 332. The calibration hole 332 is provided in a known location relative to the array of receptacles 112R in the sample rack 112. The calibration hole 332 may have a diameter larger than the stylus 227, such as several times a diameter of the stylus. For example, the calibration hole 332 may have a diameter of about 6 mm, whereas the stylus 227 may have a diameter of about 2 mm, for example. Other values may be used.

Figure 3D:
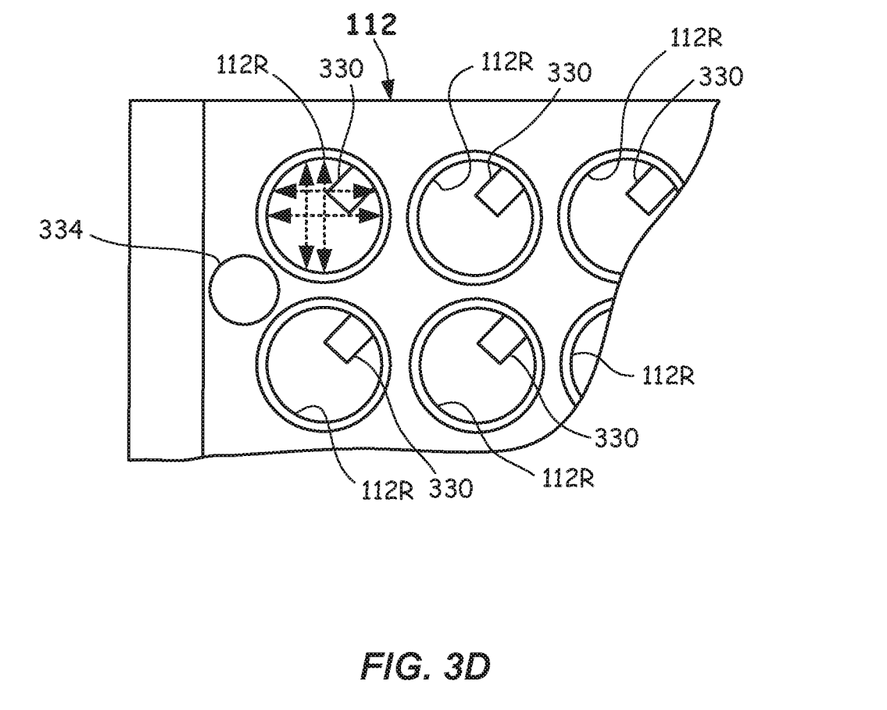
FIG. 3D illustrates a partial top view of a sample rack illustrating four moves of the stylus of the calibration tool in a recess comprising a receptacle according to one or more embodiments.

FIG. 3D illustrates that multiple measurements may be taken in the recess (e.g., receptacle 112R) along each of the directions (e.g., X and Y). Each measurement may be moved slightly in a direction away from any expected component that may be resident in the receptacle 112R, such as from spring 330 so that interference therewith is avoided.

Figure 4:
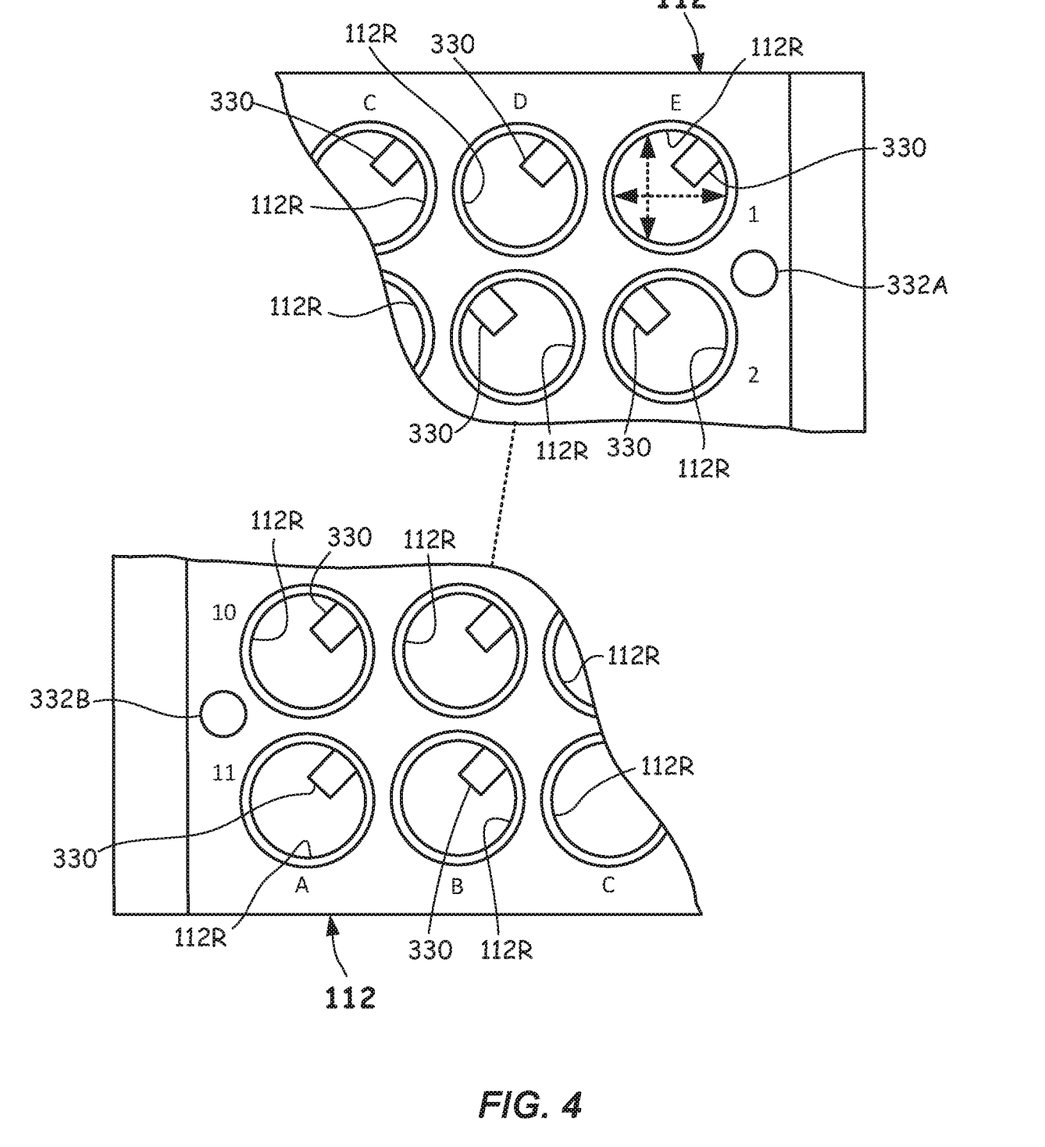
FIG. 4 illustrates a partial top view of two portions a sample rack with the middle portion removed and illustrating positions of multiple locating recesses for the calibration tool according to one or more embodiments.

FIG. 4 illustrates a first recess as a first calibration hole 332A and a second recess as a second calibration hole 332B on another part of the sample rack 112, wherein determining the center locations of the first calibration hole 332A and second calibration hole 332B using the stylus 227 and method 500 according to embodiments can then be used to define the X, Y, and Z locations of other features. For example, the center location of each of the array of receptacles 112R may be determined based on knowing the center locations of the first calibration hole 332A and second calibration hole 332B and the geometry of the components (e.g., sample rack 112). This, the center of each of the array of receptacles 112R can be determined in the X and Y directions and the bottom of each receptacle 112R may be determined based upon the known geometry and the depth from the crush zone 334.

Figure 5:
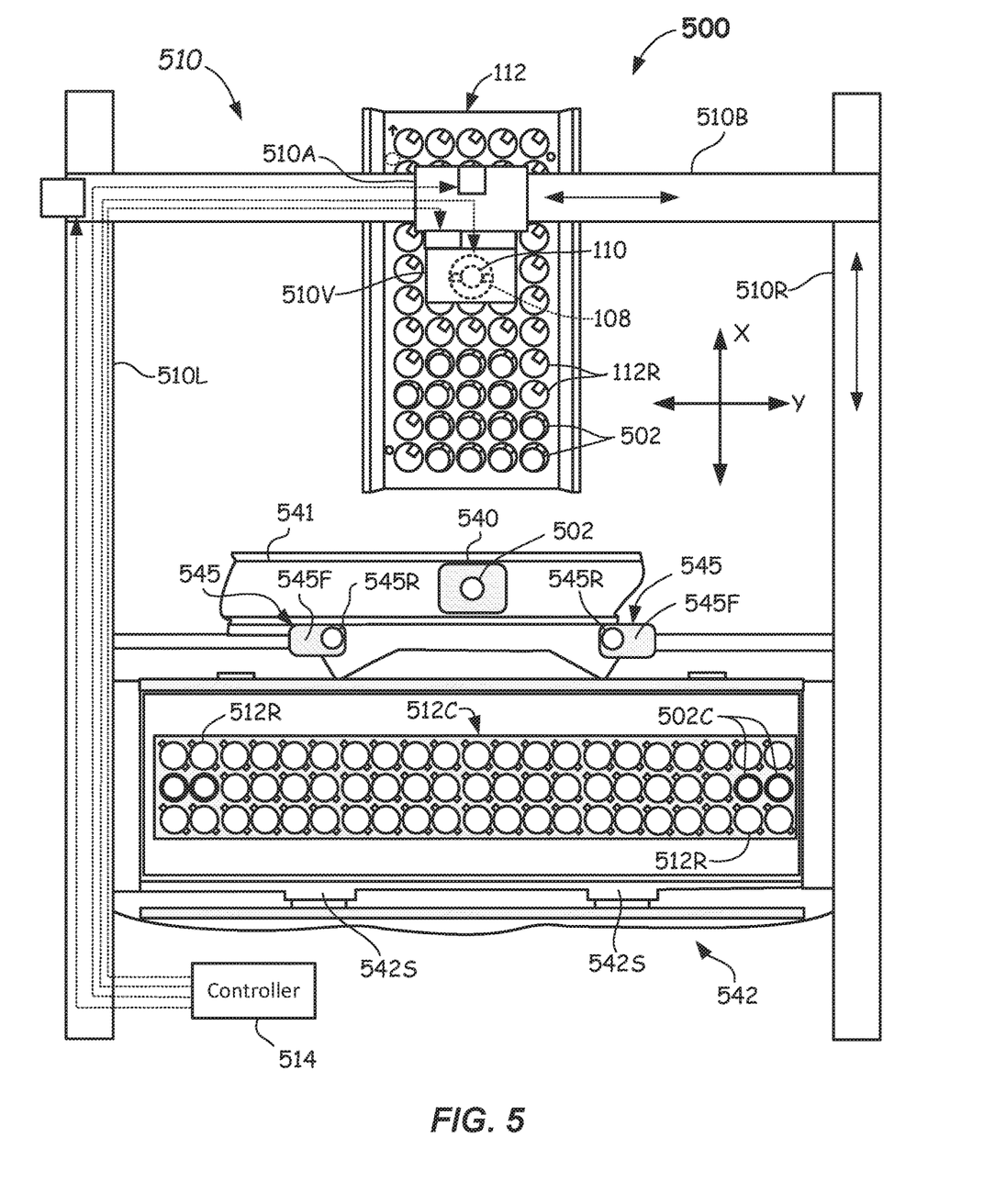
FIG. 5 illustrates a partial top view of a robot calibration apparatus including an imaging location and cold storage system according to one or more embodiments.

FIG. 5 illustrates another embodiment of a robot calibration apparatus 500 configured to carry out the method 500. The robot calibration apparatus 500 includes a robot 510 including moveable arms. The moveable arms may include a moveable cross arm 510A that may move back and forth on cross beam arm 510B. Similarly, cross beam arm 510B may move back and forth on gantry beams 510L, 510R. A gripper 108 may be coupled to one of the moveable arms, such as to a vertical arm 510V, which is moveable vertically relative to the moveable cross arm 510A. Thus, the robot 510 may move the gripper 108 in the X, Y, and Z coordinate system so that the gripper 108 may access receptacles 112R of the sample rack 112, and may also access a specimen container carrier 540 and a cold storage system 542 containing refrigerated specimen containers 502C (a few labeled). Thus, the robot 510 and gripper 108 may transport specimen containers 502, 502C between the sample rack 112 and/or a refrigerated sample rack 512C and specimen container carrier 540. The specimen container carrier 540 travels on a track 541 to one or more destinations where testing or processing takes place on the specimen contained in the specimen container 502, 502C.

The gripper 108 includes the same structure as was described with reference to FIGS. 1 and 2, and includes the a crush sensor 116 configured to sense a crush event, and a crash sensor 118 configured to sense a crash event, such as when moving specimen containers 502, 502C. The crush sensor 116 and crash sensor 118 are used in the gripper 108 during transport of specimen containers 502, 502C so as to determine contact between the specimen container 102, 102L and another article thus minimizing specimen container breakage or hard contact with the other article. To carry out the calibration method, the gripper 108 may be coupled to a calibration tool 110 as previously described.

The robot calibration apparatus 500 may include one or more components positioned in the coordinate system. For example, the one or more components may be one or more camera mounts 545 (two shown) configured and adapted to mount a camera that is used for imaging the specimen container carrier 540 and/or the specimen container 502 on the track 541. The camera mounts 545 may be provided in a fixed relationship to the track 541, and may be rigidly coupled thereto, such as by fasteners (e.g., bolts, screws, or the like). Thus, determining the location of the camera mounts 545 may determine the location and orientation of the track 541, because the two are provided in a fixed geometric relationship. The one or more components (e.g., camera mounts 545) include a recess 545R and a flat surface 545F. The one or more cameras register on the recess 545R and on the flat surface 545F for orientation thereof. Cameras may be secured to the camera mounts 545 in a known configuration and orientation, such as by fasteners (e.g., bolts, screws, or the like).

In another embodiment, the component may be the cold storage system 542. The component in each case includes a recess and a flat surface acting as a crush zone. For example, in the cold storage system 542, the flat surface may be any suitable flat surface (e.g., one or more registry surfaces 542S) that are positioned at a known distance to a feature of the refrigerated sample rack 512C in the vertical dimension. For example, the vertical distance between a top surface of the refrigerated sample rack 512C and the registry surfaces 542S of the crush zone may be known. The recess may be one or more of the receptacles 512R in the refrigerated sample rack 512C.

Robot calibration apparatus 500 may include a controller 514 operably coupled to the robot 510, wherein the controller 514 is configured and operable to cause movement of the calibration tool 110 in a first direction (e.g., in the Z direction) to contact the flat surface which is a crush zone (e.g., flat surface 545F and/or registry surface 542S) and record a first contact coordinate in the first direction in the coordinate system based on signals from the crush sensor 116. Likewise, the controller 514 is configured and operable to cause motion of the calibration tool 110 in second directions (e.g., in X and Y directions) to contact opposing sides of the recess (e.g., receptacle 512R and/or recess 545R) and record second contact coordinates in the second directions in the coordinate system based on signals from the crash sensor 118.

The controller 514 is configured and operable to process the first and second contact coordinates received from the crush sensor 116 and the crash sensor 118 to determine a location of a feature of the component in the first direction (e.g., height in the Z direction), and a center location of the recess (e.g., receptacle 512R and/or recess 545R). From this information, the gripper 108 may be easily calibrated to the component(s), so that the gripper may accurately pick or place specimen containers 502C at the cold storage system 542. Likewise, the cameras that mount to the camera mounts 545 may be accurately calibrated to the track 541.

Calibration of the location of the component comprising the sample rack 112 by using the existing crush sensor 116 and crash sensor 118 of the gripper 108 may be as previously described.

While the invention is susceptible to various modifications and alternative forms, specific system and apparatus embodiments and methods thereof have been shown by way of example in the drawings and are described in detail herein. It should be understood, however, that it is not intended to limit the invention to the particular systems, apparatus, or methods disclosed but, to the contrary, the intention is to cover all modifications, equivalents, and alternatives falling within the scope of the invention.

What is claimed is:

1. A method of calibrating a position of a gripper to a sample rack, comprising:
   providing a robot including the gripper, the gripper moveable in a coordinate system and including a crush sensor and a crash sensor, the crush sensor configured to sense a vertical crush event and the crash sensor configured to sense a horizontal crash event;
   providing a calibration tool coupled to the gripper;
   providing a sample rack including a recess and a crush zone;
   lowering the gripper in the coordinate system and sensing vertical contact between the calibration tool and the crush zone of the sample rack, as sensed by the crush sensor;
   recording the vertical position in the coordinate system of the vertical contact, as sensed by the crush sensor;
   moving the gripper in the coordinate system to position the calibration tool within the recess;
   moving the gripper in first horizontal directions that are away from a component resident in the recess in the coordinate system and sensing contact between the calibration tool and two first horizontal positions of the recess, as sensed by the crash sensor;
   moving the gripper in second horizontal directions that are away from the component resident in the recess in the coordinate system and sensing contact between the calibration tool and two second horizontal positions of the recess, as sensed by the crash sensor;
   recording the two first horizontal positions and the two second horizontal positions; and
   processing the two first horizontal positions and the two second horizontal positions to determine a location of a center of the recess.

2. The method of claim 1, wherein the calibration tool is gripped by gripper fingers of the gripper, and wherein the calibration tool includes one or more tool positioning features that engage with one or more gripper positioning features formed on one or more of the gripper fingers.

3. The method of claim 2, wherein the tool positioning features comprise one or more pins.

4. The method of claim 2, wherein the first horizontal directions are along an X axis and the second horizontal directions are along a Y axis, or vice versa.

5. The method of claim 4, wherein the sensing contact with the crush zone of the sample rack with the calibration tool comprises contacting a stylus of the calibration tool with a flat surface formed on the sample rack.

6. The method of claim 5, wherein a vertical distance to a flat bottom surface of the stylus from one or more tool positioning features is a known distance.

7. The method of claim 1, wherein the recess formed in the sample rack comprises a receptacle.

8. The method of claim 1, comprising:
providing a second recess in the sample rack;
moving the gripper to position the calibration tool within the second recess;
moving the gripper in third horizontal directions and sensing contact between the calibration tool and two third horizontal positions of the second recess, as sensed by the crash sensor;
moving the gripper in fourth horizontal directions and sensing contact between the calibration tool and two fourth horizontal positions of the second recess, as sensed by the crash sensor;
recording the two third horizontal positions and the two fourth horizontal positions; and
processing the two third horizontal positions and the two fourth horizontal positions to determine a center of the second recess.

9. The method of claim 1, comprising:
horizontally moving the gripper in third horizontal directions in the coordinate system and contacting two third horizontal positions of the recess with a stylus of the calibration tool as sensed by the crash sensor;
horizontally moving the gripper in fourth horizontal directions in the coordinate system and contacting two fourth horizontal positions of the recess with a stylus of the calibration tool as sensed by the crash sensor; and
recording the two third horizontal positions and the two fourth horizontal positions in the coordinate system as making contact is sensed by the crash sensor.

10. The method of claim 1, wherein the sensing contact between the calibration tool and two first horizontal positions includes contacting a first side of the recess followed by contacting a second opposite side of the recess.

11. The method of claim 1, comprising determining a location of a center of a second recess in the sample rack in the coordinate system.

12. The method of claim 11, comprising determining a location of other features of the sample rack based upon determining the position of the center of the recess and the position of the center of the second recess in the sample rack in the coordinate system.

13. A robot calibration apparatus, comprising:
a robot including a gripper, a crush sensor configured to sense a vertical crush event, and a crash sensor configured to sense a horizontal crash event, the robot configured to cause motion of the gripper in a coordinate system;
a calibration tool coupled to the gripper;
a sample rack including a recess and a crush zone positioned in the coordinate system; and
a controller operably coupled to the robot, the controller configured and operable to:
cause vertical movement of the calibration tool to contact the crush zone and record vertical contact coordinates in the coordinate system,
cause horizontal motion of the calibration tool in a direction away from a component resident in the recess to contact sides of the recess and record horizontal contact coordinates in the coordinate system, and
process the vertical contact coordinates received from the crush sensor and horizontal contact coordinates received from the crash sensor to determine a location of a vertical feature of the sample rack and a center of the recess in the coordinate system.

14. The robot calibration apparatus of claim 13, comprising a stylus on the calibration tool including a flat end surface and a horizontal cylindrical diameter of a known dimension.

15. The robot calibration apparatus of claim 13, wherein the recess formed in the sample rack comprises a receptacle.

16. The robot calibration apparatus of claim 13, wherein the recess formed in the sample rack comprises a calibration hole.

17. The robot calibration apparatus of claim 13, comprising a second recess formed in the sample rack.

18. The robot calibration apparatus of claim 13, comprising a storage location of the calibration tool within reach of the gripper.

19. The robot calibration apparatus of claim 13, wherein the robot comprises moveable arms and the gripper is coupled to one of the moveable arms.

20. A robot calibration apparatus, comprising:
a robot including moveable arms and a gripper coupled to one of the moveable arms, a crush sensor configured to sense a crush event, and a crash sensor configured to sense a crash event, the robot configured to cause motion of the gripper in a coordinate system;
a calibration tool coupled to the gripper;
a component including a recess and a flat surface, the component positioned in the coordinate system; and
a controller operably coupled to the robot, the controller configured and operable to:
cause movement of the calibration tool in a first direction to contact the flat surface and record a first contact coordinate in the first direction in the coordinate system based on signals from the crush sensor,
cause motion of the calibration tool in second directions and third directions each away from a component resident in the recess to contact opposing sides of the recess and record second and third contact coordinates in the second and third directions in the coordinate system based on signals from the crash sensor, and
process the first, second, and third contact coordinates received from the crush sensor and the crash sensor to determine a location of a feature of the component in the first direction, and a center of the recess.

21. The robot calibration apparatus of claim 20, wherein the component comprises a sample rack and the flat surface comprises a crush zone.

22. The robot calibration apparatus of claim 20, wherein the first direction is a vertical direction.

23. The robot calibration apparatus of claim 20, wherein the component comprises a cold storage location for bio-liquid specimen containers.

24. The robot calibration apparatus of claim 20, wherein the component comprises a camera mount configured to mount a camera of a vision system configured to provide imaging of a specimen container carrier.

* * * * *